(12) United States Patent
Garbar et al.

(10) Patent No.: US 8,101,005 B2
(45) Date of Patent: ***Jan. 24, 2012

(54) PROCESS OF MAKING METAL NANOPARTICLES

(75) Inventors: Arkady Garbar, Yoqneam Illit (IL); Dmitry Lekhtman, Nazaret-Illit (IL); Thomas Zak, Wyoming, MN (US); Fernando de la Vega, Zichron Yacov (IL)

(73) Assignee: Cima NanoTech Israel Ltd., Caesarea (IL)

( * ) Notice: Subject to any disclaimer, the term of this patent is extended or adjusted under 35 U.S.C. 154(b) by 279 days.

This patent is subject to a terminal disclaimer.

(21) Appl. No.: 11/962,688

(22) Filed: Dec. 21, 2007

(65) Prior Publication Data
US 2009/0158890 A1 Jun. 25, 2009

(51) Int. Cl.
*B22F 9/08* (2006.01)

(52) U.S. Cl. ............... 75/331; 75/332; 75/371; 977/888; 977/895

(58) Field of Classification Search ..................... None
See application file for complete search history.

(56) References Cited

U.S. PATENT DOCUMENTS

| | | | | |
|---|---|---|---|---|
| 3,839,011 A * | 10/1974 | Larson, Jr. | ..................... | 502/301 |
| 3,844,777 A * | 10/1974 | Werner | .......................... | 420/528 |
| 4,257,830 A * | 3/1981 | Tsuya et al. | ................... | 148/112 |
| 4,668,355 A * | 5/1987 | Lin | ............................... | 205/216 |
| 7,217,386 B2 | 5/2007 | Wan et al. | | |
| 7,544,229 B2 * | 6/2009 | Garbar et al. | ..................... | 75/343 |
| 7,592,292 B2 * | 9/2009 | Tsai et al. | ...................... | 502/346 |
| 2006/0093510 A1 * | 5/2006 | Obata et al. | ................... | 420/501 |
| 2006/0112785 A1 | 6/2006 | Garbar et al. | | |
| 2007/0231960 A1 * | 10/2007 | Pavier et al. | ................... | 438/106 |

* cited by examiner

*Primary Examiner* — George Wyszomierski
(74) *Attorney, Agent, or Firm* — Fish & Richardson P.C.

(57) ABSTRACT

A process is described for making metal nanoparticles comprising (a) forming a liquid melt of a first metal having the composition of the desired nanoparticles and a second metal; (b) quenching the melt to form a solid; and (c) removing the second metal from the solid and forming the nanoparticles comprising the first metal.

19 Claims, 4 Drawing Sheets

Figure 1 is a transmission electron micrograph (TEM) of silver nanoparticles made by the process.
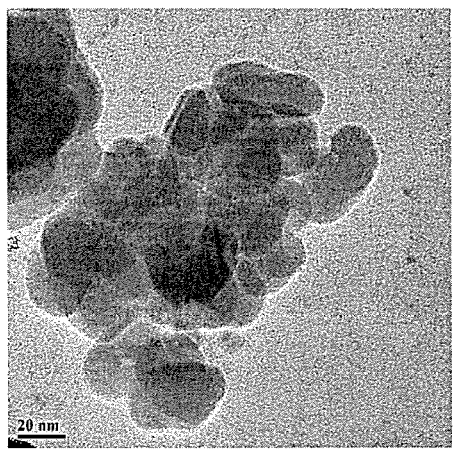

Figure 2: Leaching time of 45 minutes
X50,000
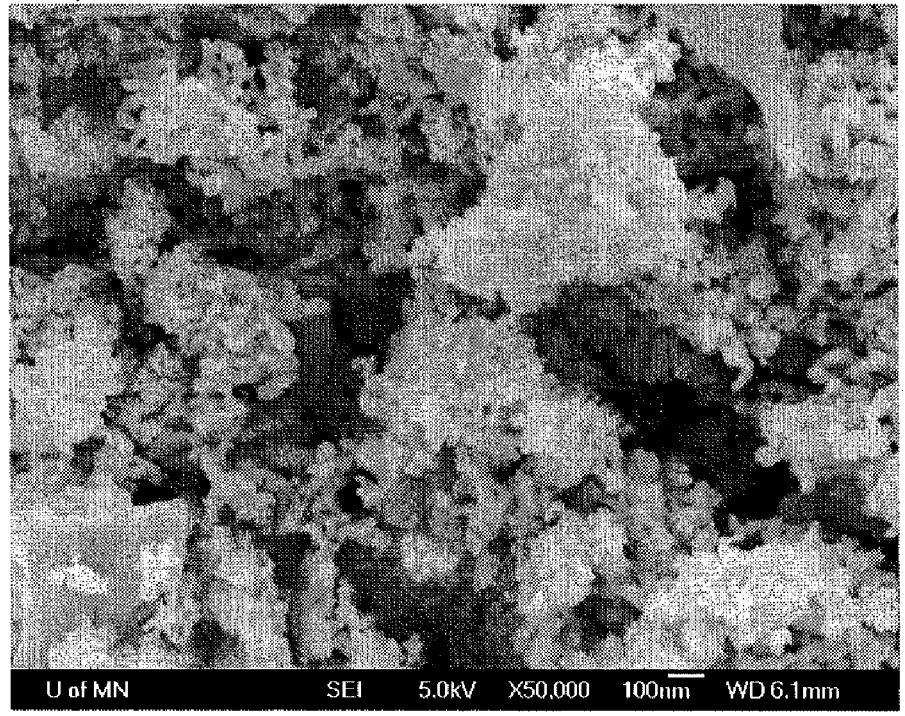
X100,000
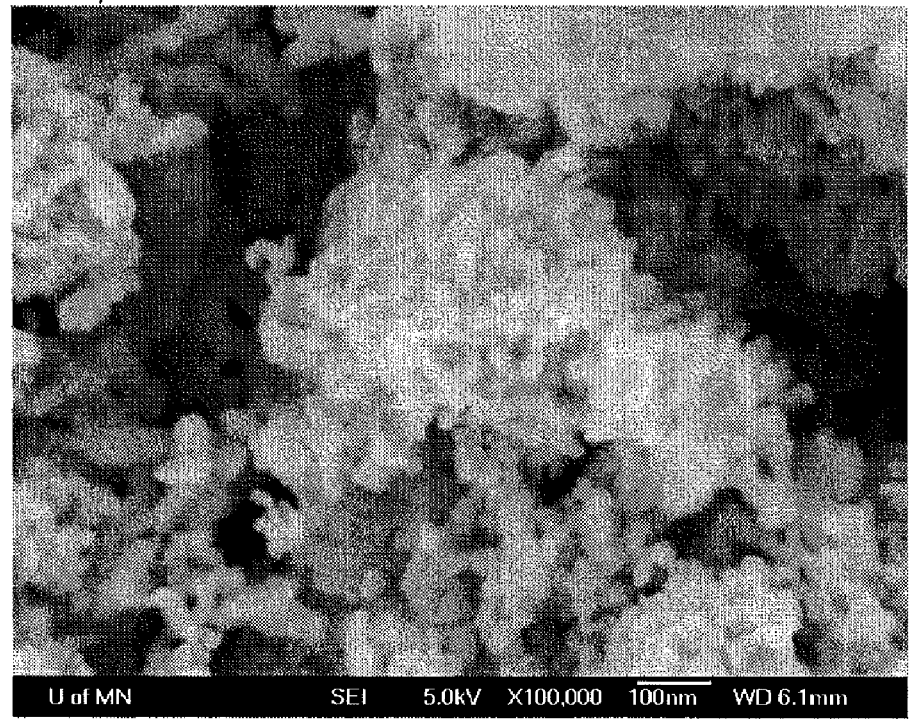

Figure 3: Leaching time 90 minutes
X50,000
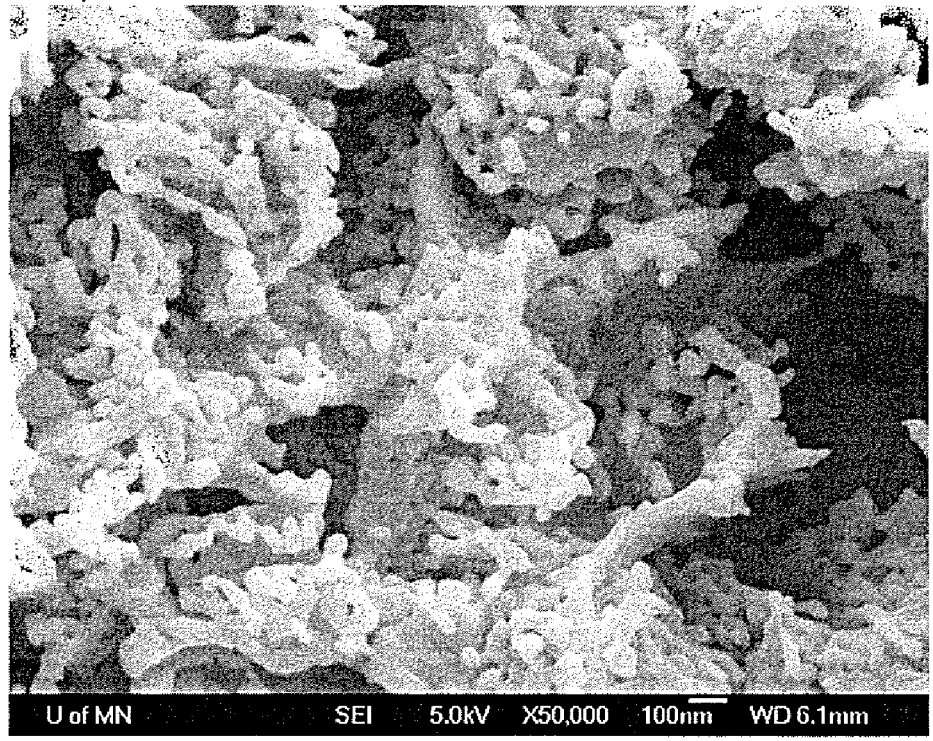
X100,000
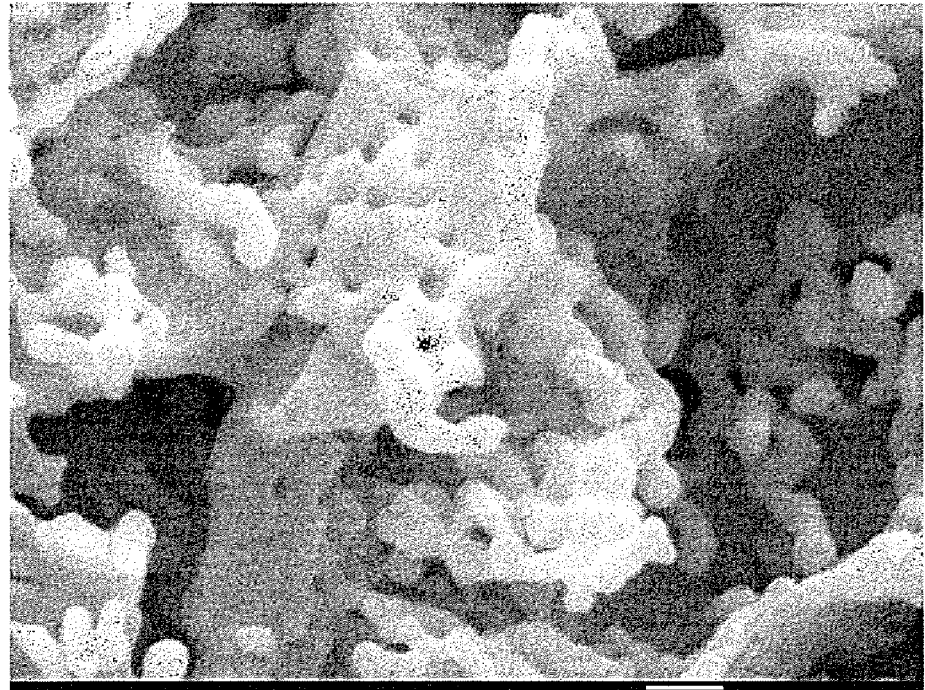

Figure 4: Leaching time of 24 hours
X50,000
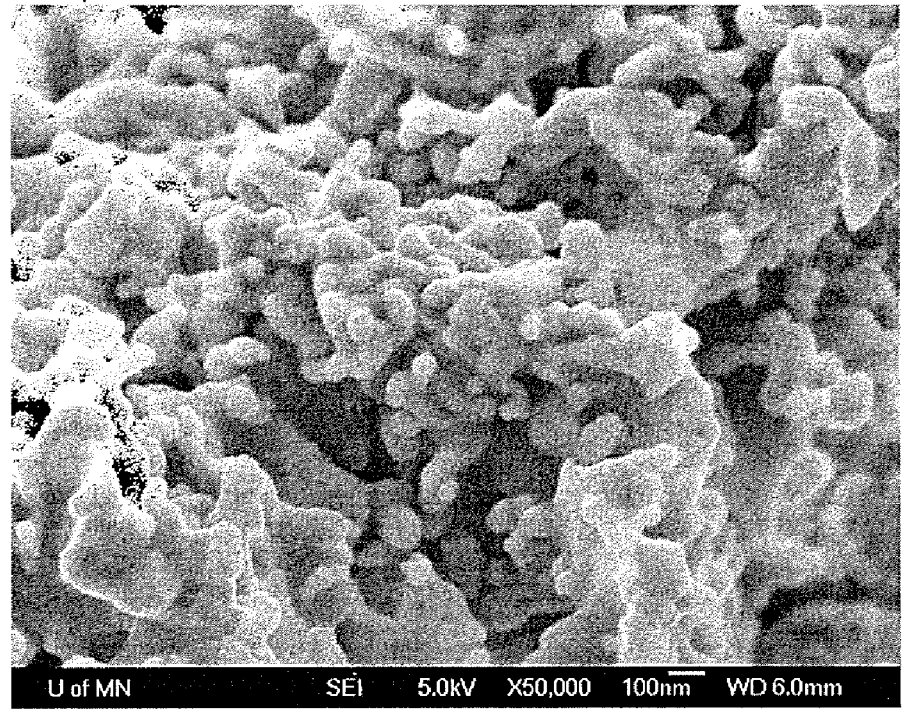
X100,000
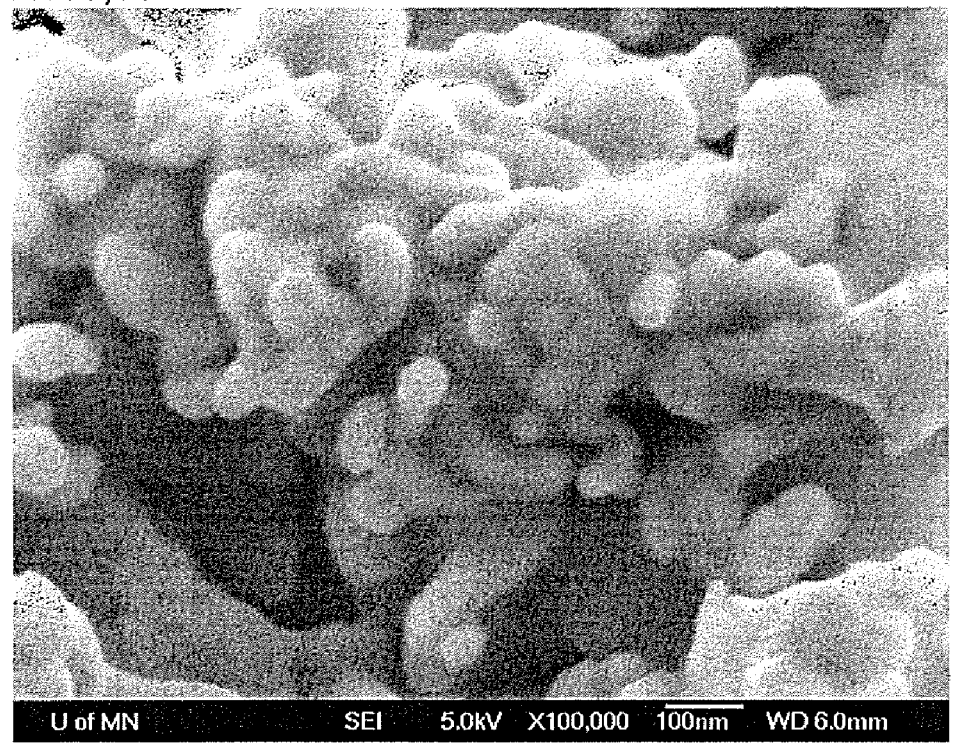

US 8,101,005 B2

PROCESS OF MAKING METAL NANOPARTICLES

FIELD OF THE INVENTION

This invention relates to a method for making metal nanoparticles.

BACKGROUND

Nano-scale particles are well known. Their properties are exploited in numerous products such as coatings, inks, pharmaceuticals, therapeutic preparations, and cosmetics, and as additives in matrix materials such as thermoplastics and thermosets. Due to the significant percentage of atoms at the surface relative to the total number of atoms in the material, nanoparticles may additionally have unique or useful size-dependent properties that are different from those of the bulk material of the same composition.

Of particular interest are metal nanoparticles that can be formulated, for example, into conductive inks and coating for applications in the electronics industry. While various methods are known for making metal nanoparticles, a need exists for more efficient and cost-effective methods.

SUMMARY

According to the present method, nanoparticles of a first metal are made from a liquid melt comprising the first metal and a second metal, which melt is quenched to form a solid. The second metal is selectively removed from the solid to form nanoparticles of the first metal. In subsequent optional steps, the nanoparticles can be collected and/or coated with a material, for example, to prevent agglomeration and/or enhance dispersability in a liquid.

The components of the melt include at least two different metals that preferably form a solution or liquid alloy or are uniformly dispersed in the liquid melt state before quenching and in the solid state after quenching. Upon quenching from the liquid melt state, a solid is obtained that can then undergo removal of the second metal so as to yield a powder comprised of nanoparticles of the first metal. Quenching to a temperature below 80° C. is preferred, more preferably below 50° C., and most preferably below 40° C. The quenching step is preferably carried out very rapidly, e.g., at a rate greater than 1000° C. per second, and preferably soon enough after quenching to prevent excessive phase separation of the components. In one embodiment, leaching is carried out immediately after quenching.

In most cases, the second metal is selectively removed from the solid by solubilizing it in a leaching agent, leaving behind nanoparticles of the first metal.

In an illustrative embodiment, the components of the melt form a molten solution of silver and aluminum. Preferably, the silver is less than 80% by weight of the melt, more preferably less than 60% by weight of the melt, and most preferably less than 50% by weight of the melt. In the quenched solid, the aluminum is selectively removed by solubilization in an aqueous hydroxide leaching agent such as sodium hydroxide or potassium hydroxide leaving silver nanoparticles.

BRIEF DESCRIPTION OF THE DRAWINGS

FIG. 1 is a transmission electron micrograph (TEM) of silver nanoparticles made by the process.

FIGS. 2-4 are scanning electron micrographs (SEMs) of silver nanoparticles made by the process illustrated in Example 3 with different leaching times.

DETAILED DESCRIPTION

The term "nanoparticles" as used herein refers to particles wherein at least one dimension of the particle is sub-micron and/or at least one property of the particles differs from those of the bulk material of the same composition. "Nanopowders", "nanoparticles", "nano-scale particles", "ultra-fine" or "sub-micron" powders or particles, and other similar terms as used herein are interchangeable with the term "nanoparticles".

According to the process, a liquid melt comprising at least two metals is formed. The components are selected so as to form a molten solution, that is, where the metals form a homogeneous mixture or are uniformly dispersed. Combinations of metals may be selected so as to lower the melt temperature of the combination relative to that of the individual components. For example, eutectic mixtures at or near their eutectic point will have a melting point that is lower than that of either of the pure metals.

The melt is then quenched. A sufficiently rapid quench to a sufficiently low temperature will freeze the metal components into a homogenous or finely structured solid state. Maintaining the solid at a sufficiently low temperature may prevent or limit further changes in that material structure. The specific rate of quenching, final temperature, and final temperature dwell time may influence homogeneity or nanomaterial structure, domain sizes, and other structural properties of the solid.

The second metal of the solid is then preferentially removed from the solid, preferably before material structure evolution, such as phase separation, can take place. The remaining first metal has the form of nano-particles or an agglomerated powder that contains nano-particles with the desired composition.

The second metal and any other components that are ultimately removed from the solid formed during quenching may also be referred to as the "matrix" material. The matrix material is generally removed from the solid by solubilization in a material referred to as a "leaching agent".

Metal components of the melt can include elemental metals, or metals contributed from metal oxides, metal sulfides, metal nitrides, metal halides, metal salts, and the like. The metal may be selected from the group containing, but not limited to, platinum, iridium, gold, silver, aluminum, magnesium, palladium, platinum, rhodium, ruthenium, titanium, osmium, rhenium, copper, nickel, cobalt, iron, indium, tin, zinc, neodymium, boron, and combinations thereof.

The raw materials can be supplied in various forms including, but not limited to, pellets, flakes, or pieces, or can be provided after cutting, grinding, milling or otherwise comminuted from larger forms. The purity of the raw materials can be high or low, depending on the desired composition and purity of the final product and depending on the application. Raw materials can be provided in crystalline, semi-crystalline, or amorphous form.

The matrix material (second metal) and the leaching agent are chosen such that the matrix material can be removed from the quenched solid without significant removal of the desired nanoparticles. Non-limiting examples of matrix materials are hydroxide-soluble metals such as aluminum, magnesium, or calcium. In these cases, the melt-quenched solid is exposed to a suitable liquid hydroxide preparation, such as potassium hydroxide or sodium hydroxide, and the soluble matrix material is thereby leached out of the solid. Other non-limiting examples of matrix materials include acid-soluble solids such as magnesium, aluminum and zinc which are then exposed to acidic liquids for the purpose of leaching, or alternatively, water-soluble salts such as NaF, KCl, or MgCl which are subsequently dissolved in water, thereby leaving behind the desired nanoparticles.

In a preferred embodiment, aluminum is selected as a hydroxide-soluble matrix material, while silver with copper, or silver alone, are selected as the first metal that will yield a nanoparticle powder with a high silver content. The aluminum, silver, and copper components are supplied in pellet form in purities above 99.9% and are then processed to form a melted mixture with the desired weight ratio. Preferred melt compositions are <80% by weight Ag, more preferred are <60% by weight Ag, even more preferred are <50% by weight Ag.

The desired amounts of starting materials can be measured by weight, volume, or any other accepted method that gives the desired ratio of components. The minimum temperature for melt formation depends on its exact composition and is determined from the temperature-composition phase diagram of the selected components at the operating pressure and conditions of the process. Kinetic effects may also influence the melting behavior of the components or of the melt.

The components can be dry-mixed prior to melting, and/or mixed after melting. They can be introduced separately or by groups into a vessel for melting, or they can be introduced into a vessel already in the melt state. They can also be preformed into a solid solution or alloy in a separate batch or continuous casting step, for example for the purpose of giving a desired shape or dimensions for ease of handling or storage prior to the melting step of the process.

To obtain the melt, the vessel is heated by any known means to the desired melt temperature, for example by sources such as heat, radiation, infrared radiation, electric means, induction, and so forth. Temperature of the melt step is T>Tm where Tm is the melting point of the alloy composition, according to the phase diagram for the components in the alloy.

Melting can be performed as a batch or continuous process. The melt can be kept in the melt state for as long as needed, and may also be mixed in order to ensure good dispersion of the components. Mixing can be effected by mechanical stirring, or application of ultrasonic or vibrational or other energy, for example by mechanical dispersers, mechanical homogenizers, ultrasonic homogenizers, vibrating vessels, or any other known means or combinations thereof. In this respect, means selected from, but not limited to, rotors, stators; dispersing elements; or screw mixing equipment are useful. If a sufficient pre-mixing step is carried out, further mixing in the melt vessel may not be necessary. In cases where a component or components would otherwise undergo an undesirable chemical change such as oxidation, it may be desirable to perform the melting and mixing steps in an inert environment. Melting and any mixing should be performed in a way that doesn't allow the melt to cool below the melt temperature.

After formation of a melt, the melted mass is quenched. Typically, but not exclusively, the resulting state of the quenched material will be a solid. Quenching can be performed in a batch or continuous process by directly immersing or otherwise depositing the melt material into or onto a medium that is significantly cooler than the melt, including a cooled solid surface, liquid, gas, aerosol, or mist. For example, cooled liquids such as water, alcohols, liquid nitrogen or other cryogenic liquids can be used. The form of the material after quenching may include bars, beads, strips, tapes, ribbons, or any other solid form. In a preferred embodiment, the melt is directly deposited onto a cooled rotating wheel or moving plate with high thermal conductivity and heat capacity. The preferred quench temperature is T (quench)<T (leaching). More specifically T (quench)<80° C., more preferred <50° C., even more preferred <40° C. As indicated in the examples below, quenching has been done using a quenching wheel that was cooled internally by liquid nitrogen, in which case T (quench) approached the temperature of the liquid nitrogen. Alternatively, the melt can be quenched directly into liquid, gaseous, or other media that is responsible for or aids in the removal of the matrix material.

Quenching of metal melts typically takes place at quench rates>1000° C./sec. Amorphous compositions can be obtained at higher quench rates on the order of $10^{6°}$ C./sec. The quenched solid may be amorphous, however it is not necessary. Alternatively, for example, solid dispersions with nanometer-scale phase separated regions may also suffice. Further, melts quenched to a super-saturated non-amorphous solid state may also give an appropriate solid for subsequent leaching.

Following the quenching step, the matrix material is removed from the solid. The matrix material can be removed by chemical or physical means, or a combination thereof. Gas phase, liquid phase, or solid phase processes or combinations thereof may be employed to remove the matrix material. For example, the removal of the matrix can be achieved by processes such as, but not limited to, sublimation, reaction to form a gas, solubilization, dissolving, chemical or plasma etching, sandblasting, diffusion, magnetic or electric migration, or any other means of removal.

In a preferred embodiment, the matrix material is removed by leaching, and the selected leaching media is specific for removal of the matrix material. Liquid leaching agents are preferred as the leaching media. The quenched solid is leached by immersion or contact with the leaching media at a specified temperature for a specified amount of time. The leaching process can be batch or continuous, and can be performed in closed or open reactors or vessels. The leaching media may be at room temperature or it may be cooled or heated, depending on the desired kinetics of the leaching process. The leaching media can be refreshed or replenished during the process. Additional leaching steps may be necessary for some metallic mixtures in order to improve purity of the resulting powder. Leaching may remove not only a complete second phase of a material, such as a substantially pure Al matrix, but may also remove metal content from a second phase of material, such as by removing Al content from a Ag-rich phase of material. The leaching process can be conducted with or without mixing, application of external energy, and/or addition of additives.

The nature of the leaching media depends on the element or compounds to be leached out of the quenched material. Preferably, the selected leaching agent provides rapid removal of the matrix material. For the case of silver-aluminum (Ag—Al) or silver-copper-aluminum (Ag—Cu—Al) mixtures in which Al is leached out to leave Ag or Ag—Cu nanoparticles, suitable leaching agents are aqueous hydroxide solutions or aqueous acid solutions. Most preferred are KOH or NaOH. Leaching concentrations, process temperatures, and contact time may be chosen such that nearly all of the matrix material is dissolved rapidly, and such that particles with a desired average particle size are obtained. Preferred leaching times are <24 hours, more preferably <12 hours. As illustrated in Example 3 below, leaching times as short as 45 minutes or even shorter may be optimal in some situations. Leaching temperatures are between 20° C.-100° C. The molar ratio of hydroxide to aluminum is typically ≧5:1. Preferred concentrations of sodium hydroxide for the leaching agent are in the range of 10-55 w/w %.

Residual content of the leachable matrix component in the nanopowder can also be controlled by the parameters of the leaching process. In this way, the amount of leachable component in the resulting particles can range from a significant amount as in a doped particle) to only a very small amount of the leachable component. Sequential leaching steps can aid in achieving very high purities of >99% of the resulting powder. If leaching exposure time is excessively long, or the concentration of the leaching agent is high, or the temperature is not controlled, then the reaction can adversely yield particles with higher than desired average particle size.

Following solubilization of the matrix material, the residual powder can be separated from the leaching media by any appropriate separation process such as filtration, decantation, centrifuging, or other separation processes. Optionally, the powder may be rinsed or washed and then sieved or sorted by other means.

It is also possible to form high purity nanoparticles from low purity raw materials. For example, a first material that contains impurities is mixed with a second material and brought to a temperature in which the first and the second materials melt but the impurities do not melt. The mixture is filtered while in the melt in order to separate out the impurities, and then the remaining materials are quenched and then treated or leached as described previously in order to remove the matrix component or components. Alternatively, the impurity melts along with the other components and after quenching it dissolves in the leaching agent.

From any of the processes described above, the resulting powder typically consists of nanoparticles in agglomerated form, where the term "agglomerated" refers to groups of individual particles, e.g. networks or clusters, held together by forces below the material strength.

In many applications, agglomerated nanoparticles are useful without additional process steps to deagglomerate them. For some applications, however, such as ink-jet inks, deagglomeration and stable dispersion of the particles may be required. For certain products and applications, deagglomeration may not be necessary but properties are generally improved significantly when agglomeration is negligible. In this way, full advantage is taken of the effects that nanoparticles provide. To obtain individual or deagglomerated particles, the powder obtained in the present invention can be subjected to subsequent deagglomeration processes in the presence of or in the absence of additional formulation components.

The nanoparticles obtained by the process may be treated to alter their surface properties, for example, to, facilitate dispersion or deagglomeration. In some cases, the agglomerates are first coated with a coating material. The coating materials applied may be organic, such as surfactants, or they may be inorganic. Alternatively, the agglomerates may be deagglomerated without a separate pre-coating step. Also, the coatings on the nanoparticle agglomerates may be synthesized in-situ, for example by using sol-gel or other techniques. The coating materials may associate with the agglomerated particles by ionic, covalent, or hydrogen-bonding mechanisms, or other means of associating. Core-shell structures can also be formed where the nanoparticles comprise the core material.

A coating process for the agglomerated particles can be a wet process or a dry process Examples of coating methods include, but are not limited to, spray coating, spin-coating, and immersion-coating, and they include coating methods and compositions such as those described in US Patent Application 2006/0112785. If coated by a wet process, the liquid carrier of the coating material may subsequently be dried by evaporation, vacuum, heating or other means.

Deagglomeration can be performed with the aid of process equipment such as, but not limited to, high shear mixers, homogenizers, mills, jet-mills, ultrasonic equipment, or microfluidizers. Deagglomeration of nanoparticles can also be performed during mixing steps with other components of a desired formulation such as components of low viscosity liquids or high viscosity pastes. Mixing of the components in the formulation can be accomplished by means of various laboratory or industrial mixing equipment such as shakers, magnetic stirrers, homogenizers, sonicators, probe sonicators, mills, blade mixers, high shear mixers, etc. Mixing with such equipment can be performed on a laboratory scale or an industrial scale.

In some cases, the average particle size obtained with the current process may be smaller than that obtained by the prior art processes when the same initial alloy composition is used.

Particles obtained via this process have a characteristic length in the sub-micron range in at least one dimension, typically but not exclusively 100 nm or less. Silver nanoparticles produced by this process after leaching out of an aluminum matrix have been observed by Transmission Electron Microscopy (TEM) to be agglomerated but relatively spherical, as seen in FIG. 1. The individual particles have a smaller average particle size than particles obtained via prior art processes in which the same initial Ag—Al alloy composition was cooled from a non-melt state prior to selective dissolution of the aluminum matrix with the same leaching agent.

Crystal structure of the obtained particles can be single crystals, polycrystals, or mixtures of different crystal types. Under sufficiently rapid quenching conditions the process can also be used to yield amorphous (non-crystalline) structures, or structures with significant amorphous content.

One of the features of metal nanoparticles is that their sintering temperature is lower than that of the bulk metal. This property can be exploited in microelectronics applications, as for example in the case of conductive inks formulated with silver nanoparticles. An appropriate silver nanoparticle formulation can be processed to form conductive patterns at low temperatures less than 300° C. In this way, the pattern-forming process is compatible with heat-sensitive substrates, including many flexible substrates desired for state-of-the-art electronic components.

Sintering or other physical or chemical transitions of the nanoparticle formulations, either with solvent still present or after the solvent has been removed, may be induced by the application of energy by means of thermal, microwave, or UV-light sources, or any other means of triggering the desired transition.

The nanoparticles that have been produced by this process may be used as is (dry powder) or in formulations. Formulations made with these nanoparticles can have various forms, for example, but not limited to, liquid dispersions or emulsions, or viscous gels, creams, pastes, or other forms. Solids with dispersed nanoparticles can also be prepared by mixing of the particles into polymers, waxes, or other solid materials. In general, particle concentration can be up to 95% by weight and as low as desired. In some special cases, formulations having greater than 95% by weight of particles have been made. Viscosity can be controlled by the solvent system, the additives, and the concentration of the nano-powder.

Non-limiting examples of low viscosity systems with nanoparticles are ink-jettable inks that contain nano-silver particles. Non-limiting examples of high viscosity systems with nanoparticles are screen-printable pastes that contain silver nanoparticles and are used to form conductive microelectronics features.

Low viscosity and high viscosity nanoparticle formulations can be prepared in water-based or organic solvent systems, and in polar or non-polar systems. Nanoparticles can also be incorporated into solvent-based UV-curable monomer and polymer systems.

Nanoparticles may be incorporated into formulations that are useful as inks and coatings for microelectronic applications. In their final state, the inks or coatings can have conductive, non-conductive, semi-conductive, or dielectric functions. Applications for such inks or coatings include radio frequency identification (RFID) patterns, printed circuits, electromagnetic interference (EMI) shielding, sensors, electrodes, diodes, transistors, resistors, capacitors, and other electronic components. Alternatively or in addition, such inks or coatings can be used in a wide variety of other applications, for example as photovoltaic devices such as solar cells, in light emitting diodes (LED), or for e-paper, decorative printing, or for electrostatic control, or for their magnetic properties in sealing, or shielding, sealing as on plasma displays or liquid crystal displays (LCD), or other applications. Alternatively or in addition, such inks or coatings can be used for marking or labeling. The various applications may also rely on radiation absorption, thermal sensitivity, phosphorescence or other properties that are provided by components present in the formulation.

Coatings or inks or components prepared with the nanoparticles can be opaque or transparent. Applications where transparency can be important include EMI shielding and electrodes, for example, as applied to products such as plasma displays, solar cells, and touch screens.

The nanoparticles can also be used, for example, in formulations for pharmaceutical and cosmetics applications, and as additives in materials such as thermoplastics and thermosets, or in fibers including fibers prepared by electrospinning. Alternatively or in addition, the presence of certain types of nanoparticles can provide for antimicrobial properties or control of mechanical properties, electronic properties, or therapeutic properties.

The process is further illustrated by the following non-limiting examples.

Example 1

Ag—Al alloy with 30% Ag by weight and 70% Al by weight was produced and formed into strips as described in US Patent Application 2006/0112785. Portions of the strips were pre-cleaned with NaOH, weighed, and placed in a vertical pipe-shaped crucible furnace. The pipe-shaped crucible furnace was then placed inside a vertical outer pipe of the furnace and heated to 950° C. This temperature was chosen because it is above the melting point of the selected composition as determined from the alloy phase diagram. Argon was also occasionally and briefly fed through a feed port at the top of the inner pipe until a temperature of 550° C. was reached. An exit port present at the bottom of the inner pipe was positioned ~0.5-0.75 cm directly above a rotating copper wheel having a diameter of approximately 60 cm that is cooled internally by means of liquid nitrogen supply (the "quenching wheel"). The rotational speed of the quenching wheel was controlled by an external motor.

The crucible furnace was held at the desired melt temperature for approximately 30 minutes in order to ensure that all portions of the mixture were in the melt state. Then argon gas was fed into the top of the inner crucible pipe. Immediately prior to the quench step, the speed of the quenching wheel was raised to ~1100 rpm. Quenching of the melt then occurred as the molten alloy exited the port at the bottom of the crucible furnace and was deposited onto the rotating chilled quenching wheel.

The quenched alloy material was then immersed in a leaching bath containing 25% NaOH solution. NaOH is appropriate for leaching the Al component from the quenched material. The desired temperature and time of leaching depend on the alloy used and the nanopowder properties desired. In this case, the leaching bath was kept below 40° C. and leaching time was limited to less than 24 hours so as to obtain an optimal small particle size.

The leaching process was performed continuously with the quenching process by immediately relaying the quenched solid into a leaching bath. Alternatively, the quenched material can be collected and leached in a separate subsequent step. Similarly, the leached material can be collected or otherwise relayed to additional leaching baths or leaching steps in order to increase powder purity or otherwise affect the resulting nanoparticle properties.

Example 2

An Ag—Al alloy with 30% Ag by weight and 70% Al by weight was produced and formed into strips as described in Example 1. Portions of the strips were pre-cleaned with NaOH, weighed, and placed in a vertical pipe-shaped crucible furnace. The pipe-shaped crucible furnace was then placed inside the vertical outer pipe of the furnace and heated to 850° C. Argon was also occasionally and briefly fed through a feed port at the top of the inner pipe until a temperature of 550° C. was reached. An exit port present at the bottom of the inner pipe was positioned ~0.5-0.75 cm directly above the quenching wheel.

The crucible furnace was held at the desired melt temperature for approximately 20 minutes in order to ensure that all portions of the mixture were in the melt state. Then argon gas was fed into the top of the inner crucible pipe. Immediately prior to the quench step, the speed of the quenching wheel was raised to ~450 rpm. Quenching of the melt then occurred as the molten alloy exited the port at the bottom of the crucible furnace and was deposited onto the rotating chilled quenching wheel as in Example 1. The quenched material formed a ribbon with a thickness of 30-100 microns. Crystallinity of the quenched ribbon as determined by x-ray diffraction (XRD) was 75-76%.

The quenched alloy material was then immersed in a leaching bath containing 25% NaOH solution at 25° C. for about 24 hours. The residual powder was collected, rinsed with distilled water at room temperature and then dried in vacuum conditions at 35° C. The powder was then tested by XRD and found to be >99% crystalline.

Example 3

Example 1 was essentially repeated except different leaching times were used for different batches: 45 minutes, 90 minutes, 180 minutes, and 24 hours leaching.

Surface area of the leached powder as measured by the BET (Brunauer-Emmett-Teller) method was greater as the leaching time was shorter, indicating smaller particle size for shorter leaching times. BET surface area data were as follows:

| Leaching time | Surface Area (m²/gr) |
| --- | --- |
| 45 minutes | 12.4 |
| 90 minutes | 9.0 |
| 180 minutes | 6.6 |
| 24 hours | 1.6 |

The nanoparticles formed at each leaching times of 45 minutes, 90 minutes, and 24 hours are shown in the SEMs of FIGS. 2-4, respectively.

What is claimed is:

1. A method of making nanoparticles comprising a first metal comprising:
   a) forming a melt comprising the first metal and a second metal;
   b) directly contacting the melt with a cooled solid surface to quench the melt and thereby form a substantially homogeneous solid; and
   c) removing the second metal from the substantially homogeneous solid by solubilizing the second metal in a leaching agent to form nanoparticles comprising the first metal.

2. The process of claim 1 further comprising isolating the nanoparticles.

3. The process of claim 2 further comprising coating the nanoparticles.

4. The process of claim 1 wherein the melt comprises metals that form a solution in the melted state.

5. The process of claim 1 wherein the first metal and the second metal are provided as elemental metals or contributed by metal oxides, metal sulfides, metal nitrides, metal halides, metal salts, or combinations thereof.

6. The process of claim 5 wherein the metal of the first metal or the second metal is platinum, iridium, gold, silver, aluminum, magnesium, palladium, rhodium, ruthenium, titanium, osmium, rhenium, copper, nickel, cobalt, iron, indium, tin, zinc, neodymium, boron or combinations thereof.

7. The process of claim 6 wherein the metal component of the first metal is silver or a silver-copper alloy.

8. The process of claim 1 wherein the second metal is hydroxide soluble.

9. The process of claim 8 wherein the second metal is aluminum, magnesium or calcium.

10. The process of claim 1 wherein the second metal is removed by leaching with a hydroxide.

11. The process of claim 10 wherein the hydroxide is sodium hydroxide or potassium hydroxide.

12. The process of claim 1 wherein the first metal is silver and the second metal is aluminum.

13. The process of claim 12 wherein the silver is less than 80 percent by weight of the melt.

14. The process of claim 13 wherein the silver is less than 60 percent by weight of the melt.

15. The process of claim 14 wherein the silver is less than 50 percent by weight of the melt.

16. The process of claim 1 wherein the melt is quenched to a temperature less than 80° C.

17. The process of claim 16 wherein the melt is quenched to a temperature less than 50° C.

18. The process of claim 17 wherein the melt is quenched to a temperature less than 40° C.

19. The process of claim 1 wherein the rate of quenching is greater than 1000° C. per second.

* * * * *